Jan. 19, 1965  H. O. ROMSDAL  3,166,338
STEERING MEANS FOR VEHICLES
Filed March 13, 1963
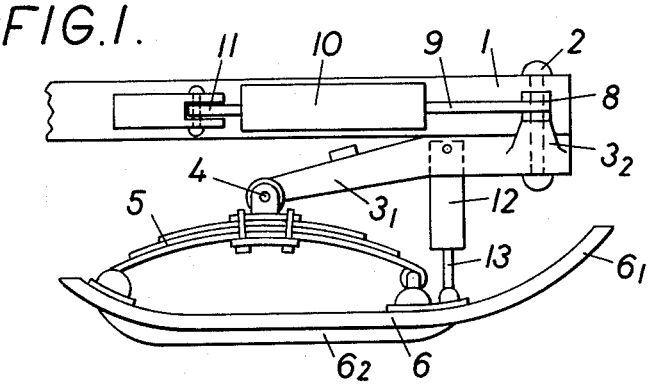
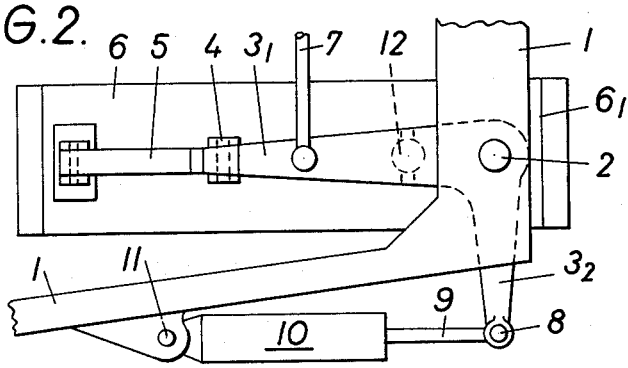
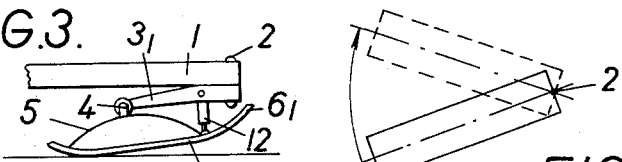
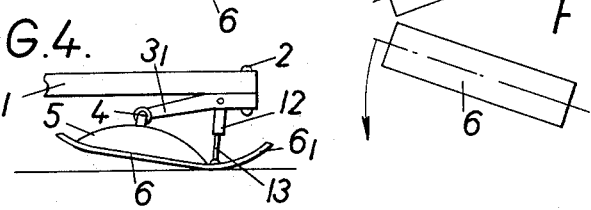
INVENTOR
Hakon O. Romsdal

United States Patent Office 3,166,338
Patented Jan. 19, 1965

3,166,338
STEERING MEANS FOR VEHICLES
Håkon Ole Romsdal, Marcellis gate 27, Oslo, Norway
Filed Mar. 13, 1963, Ser. No. 264,950
Claims priority, application Norway, Mar. 16, 1962, 143,678
3 Claims. (Cl. 280—21)

The present invention relates to a steering means for vehicles having steerable skids or skis. It is well known to effect the steering of vehicles by means of skids or skis and this manner of steering is particularly adapted for vehicles which are to move in snow, such as tractors or belt driven vehicles for use in forestry or in any transport on poor roads or through open country. In such steering means it has been found advantageous to position the vertical pivot of each skid or ski as near as possible to the foremost end of the skid, in view of the fact that the steering pressure acting transversely to the skid will then act on one side of the skid only, so as to allow a positive steering of the vehicle even when the same is working as a towing vehicle.

The present invention relates to a steering means of the type indicated above, wherein a very good steering effect is obtained without any substantial disturbing influence to the propulsion and a negligible braking effect during turning. An essential advantage of the present steering means, as compared with those previously known is, however, that turning of the vehicle may also be performed without difficulty while the vehicle is at rest. According to the invention, this is achieved by connecting each skid with the fixed frame of the vehicle through one arm of an essentially horizontal elbow or bell crank lever which is pivotably mounted about a vertical axis and the second arm of which is connected with the steering device proper.

For the purpose of enabling an adjustment of the steering effect, i.e. the pressure of the skid against the ground, so that the skid may be caused to contact the ground at its foremost or rearmost end, respectively, according to the conditions prevailing during the run, the connection between the skid and one arm of the elbow lever includes a horizontal pivot extending at right angles to the direction of length of the skid, and an adjustable distance means horizontally spaced from said pivot. Such distance means may be in the form of a hydraulic cylinder and piston arrangement. Thanks to the distance means, the skid may be so adjusted that it may be turned with a very small supporting surface against the ground, so that even turning while the vehicle is at rest does not require any particularly great force.

In the accompanying drawing, an embodiment of the steering means according to the invention is schematically shown, only such parts being shown as are essential to the understanding of the invention.

In the drawing, FIGURE 1 is a side view of the steering means.

FIGURE 2 is a plan view of the same.

FIGURES 3 and 4 illustrate a skid in different positions, as seen in side view.

FIGURE 5 illustrates a skid in different positions, as seen in a plan view.

In the drawing, 1 is the fixed frame of the vehicle, in the foremost end of which a substantially horizontal elbow or bell crank lever 3 is mounted on a vertical pivot, the lever 3 being provided with arms $3_1$ and $3_2$ which extend in the same plane and at about right angles to each other.

At the free end of the longitudinally extending arm $3_1$ there is arranged a transversely extending, horizontal pivot 4 on which there is mounted a longitudinally extending leaf spring 5 which, at its free ends, supports a skid 6. The skid is shown provided with an upturned foremost portion $6_1$ and a steering fin $6_2$ extending along the underside of the skid. The two skids of the vehicle are fixed relatively to each other by means of a transversely extending stay 7 between the two longitudinally extending arms $3_1$.

At the free end of the transversely extending arm $3_2$ of the bell crank lever 3, there is arranged a vertical pivot 8 supporting a piston rod 9 of a hydraulic cylinder and piston arrangement 10, the other end of which is pivotably mounted at 11 in the frame 1.

Just in front of the foremost end of the leaf spring 5, the skid 6 is connected to the arm $3_1$ through a hydraulic cylinder and piston arrangement 12, 13, so that the distance between the skid and the arm may be adjusted at will.

The steering of the vehicle is effected by means of the hydraulic arrangement 9, 10 and the parallel run of the skids is secured by means of the stay 7. Both the arrangement 9, 10 and the arrangement 12, 13 are controlled by fluid under pressure supplied from a source which is not shown in the drawing, through control means mounted in the control cabin of the vehicle.

As shown in FIGURES 3 and 4, it is possible by means of the arrangement 12, 13 to turn the skid 6 in a vertical plane about the pivot 4, so that the skid is caused to support the weight of the vehicle at the rear portion of the skid, FIGURE 3, or at the fore portion of the skid, FIGURE 4, respectively. In this manner, the turning of the skids and thereby of the vehicle is facilitated while driving, and even without any forward motion of the vehicle. A raising of the foremost portion of the skids, also facilitates driving in uneven country, as the skids will then climb over the inequalities of the ground without sticking, while a lowering of the foremost skid portion will stabilize the vehicle while passing down an incline. Due to the fact that the control of the arrangement 12, 13 is effected from the control cabin, it is possible quickly to adjust the skids according to the ground conditions prevailing at any particular moment.

As shown in the FIGURES 3, 4 and 5, it is possible by effecting the turning alternately at the rearmost and foremost portions of the skids, to effect to the turning of the vehicle without any forward motion of the vehicle as a whole. When turning in the manner illustrated in FIGURE 3, the vehicle frame is caused to accompany the skids in their movement about the rearward part of each skid. The skids are then pivoted to the position shown in FIGURE 4 and are then turned to the initial longitudinal position, in which movement the vehicle frame does not take part, since the bell crank lever 3 turns about the pivot 8. The skid is then pivoted by lowering the rear end and the same cycle is repeated. In this manner the vehicle frame may be turned step-by-step as far as desired, the skids performing such movements in a vertical plane as indicated by comparing the FIGURES 3 and 4, and such movements in a horizontal plane as indicated by the arrows shown in FIGURE 5.

I claim:

1. Means for the steering of vehicles provided with skids, wherein each skid is pivotably mounted on an approximately vertical axis positioned adjacent to the foremost end of the skid, the individual skid being connected to a fixed frame of the vehicle through one arm of a substantially horizontal bell crank lever which is pivotably mounted about a substantially vertical axis and the other arm of which is connected to a control means.

2. Means as claimed in claim 1, wherein each skid is connected to one arm of the bell crank lever through a horizontal pivot which extends at right angles to the main direction of the skid, an adjustable distance means being connected between the skid and the said lever arm at a point horizontally spaced from said horizontal pivot.

3. Means as claimed in claim 1, wherein each skid is connected to one arm of the bell crank lever through a horizontal pivot which extends at right angles to the main direction of the skid, a hydraulic cylinder and piston arrangement, serving as an adjustable distance means being connected between the skid and the said lever arm at a point horizontally spaced from said horizontal pivot.

References Cited in the file of this patent

UNITED STATES PATENTS

| | | |
|---|---|---|
| 1,162,806 | Rantassa | Dec. 7, 1915 |
| 2,718,367 | Doolittle | Sept. 20, 1955 |

FOREIGN PATENTS

| | | |
|---|---|---|
| 881,880 | France | Feb. 4, 1943 |